E. W. KENT.
COOKING UTENSIL.
APPLICATION FILED OCT. 10, 1908.
924,471.
Patented June 8, 1909.
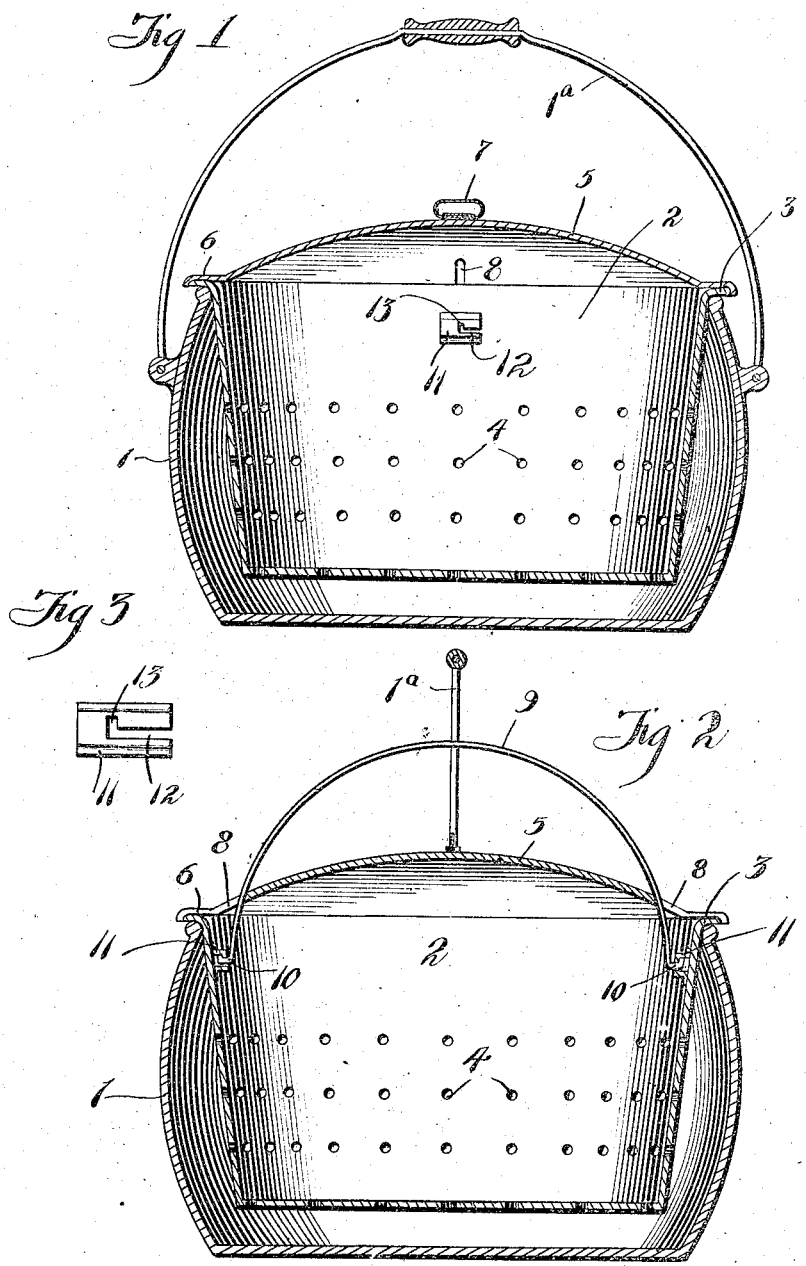
Witnesses
Alan F. Garner
C. C. Hines
Inventor
Edgar W. Kent,
By Victor J. Evans
Attorney

UNITED STATES PATENT OFFICE.

EDGAR W. KENT, OF SEATTLE, WASHINGTON.

COOKING UTENSIL.

No. 924,471.     Specification of Letters Patent.     Patented June 8, 1909.

Application filed October 10, 1908. Serial No. 457,073.

*To all whom it may concern:*

Be it known that I, EDGAR W. KENT, a citizen of the United States, residing at Seattle, in the county of King and State of Washington, have invented new and useful Improvements in Cooking Utensils, of which the following is a specification.

This invention relates to an improved construction of cooking utensil, the object of the invention being to provide a cooking utensil embodying an outer vessel in which the water employed for cooking or steaming the food is placed and an inner perforated vessel adapted to contain the food to be cooked, the construction and arrangement being such as to prevent the contents of the inner vessel from becoming scorched or burned, as well as to enable the water to be drained from the inner vessel and the contents thereof when such inner vessel is removed from the outer vessel, by which the necessity of skimming the contained liquid is obviated and liability of the hands of the operator being scalded prevented in the operation of removing the cooked food.

A further object of the invention is to provide a cooking utensil of this character in which the inner vessel closes the outer vessel and is itself adapted to be closed by a cover, and to provide a detachable handle for the inner vessel which may be applied or removed while the cover is in position, thus enabling the inner vessel to be handled and transported, as well as applied and removed, with greater ease and facility.

The invention consists of the features of construction, combination and arrangement of parts hereinafter fully described and claimed, reference being had to the accompanying drawing, in which:—

Figure 1 is a vertical transverse section of a cooking utensil embodying my invention, showing the inner vessel arranged within the outer vessel for use. Fig. 2 is a similar sectional view taken at right angles to the view shown in Fig. 1. Fig. 3 is a detail view of one of the keepers for the detachable handle.

Referring to the drawing, 1 designates the outer vessel, which is imperforate, and may be made of granite ware or other suitable material. This vessel is provided with an ordinary form of pivoted bail handle 1ª.

Within the outer vessel is adapted to be arranged an inner vessel 2 which is of relatively less diameter and depth than said outer vessel, so that it may be supported concentrically therein, to provide an intervening space for the water employed in the cooking operation and the circulation of steam generated from the water. The inner vessel may be made of granite ware or other suitable material, and is preferably provided with a flaring body and a flat bottom, and is formed at its upper edge with a laterally extending flange 3 to rest upon the rim edge of the outer vessel for the purpose of supporting the inner vessel therein. When the inner vessel is applied in position, the flange 3 rests upon the rim of the outer vessel in such manner as to close the top of the outer vessel against the escape of steam, so that all of the generated heat will be confined therein. The sides and bottom of the inner vessel are formed with perforations or openings 4, through which the hot water contained in the outer vessel may enter to cook the vegetables or other food contained within the inner vessel. These openings also permit of the free circulation throughout the inner vessel of the steam generated from the body of water in the outer vessel, and also provide for the thorough drianage of the water from the vegetables or food when the inner vessel is removed, thus leaving the contents of the removed inner vessel practically dry for dispensation.

A cover 5 is provided to close the open top of the inner vessel and is provided with a flange 6 to rest snugly upon the flange 3, and also with a pivoted handle 7 by which it may be manipulated, applied and removed. This cover is formed in its diametrically opposite sides with slots 8 for the insertion into the inner vessel of the ends of a handle 9. The handle 9 comprises a single piece of wire or metal bent into bail or bow form, and is adapted to extend at right angles through the space between the sides of the handle 1ª so as to prevent interference with the latter. The ends of the handle 9 are provided with hooked projections 10 to engage channeled keepers 11 secured upon the inner surface of the inner vessel at diametrically opposite sides thereof. As shown, each of these channeled keepers is provided with a longitudinal slot 12 opening through one end thereof and provided at its inner end with an upwardly extending notch or offset 13. The handle 9 is adapted to be applied by contracting it and forcing its ends down through the slots 8 into the inner vessel and then inserting the hooked ends 10 into the slots 12 of the keepers, and sliding them along said slots until they come into alinement with the notches 13. The spring action of the handle will then cause the hooked ends thereof to spring into and occupy the notched portions, thus pivotally locking the ends of the handle in engagement with the inner vessel. The handle 9 may thus be applied in a convenient manner when it is desired to remove the inner vessel, so that the latter may be transported without liability of injury to the hands of the operator. When the inner vessel is arranged within the outer vessel for use the handle 9 may be removed by a reversal of the applying operation before described.

It will be understood from the foregoing description that the vegetables, meat or other food to be cooked may be placed in the inner vessel, and the latter arranged within the outer vessel, in which a supply of water is to be placed. When the combination vessel is then placed upon a stove and the water is heated, water and the steam therefrom passing through the perforations 4 into the inner vessel will thoroughly cook the contents thereof. If desired, but a small amount of water may be placed in the outer vessel and the contents of the inner vessel heated by the steam generated therefrom. When the food is cooked, the handle 9 is applied, whereupon the inner vessel may be lifted from the outer vessel, the water draining out through the perforations 4 from the inner vessel back into the outer vessel, leaving the contents of the inner vessel practically dry, so as to avoid the necessity of skimming the water or subsequently draining the food. The construction described allows the inner vessel to be conveniently handled without liability of burning or scalding the hands of the operator.

Having thus fully described the invention, what is claimed as new is:—

1. A cooking utensil comprising an outer vessel, a perforated inner vessel removably supported within and closing said outer vessel, said inner vessel being provided upon the interior thereof with channeled keepers having slots opening through one of their ends and offset notches at the inner ends of said slots, a cover for the inner vessel provided with slots, and a spring bow handle provided with hooked ends passing downward into the inner vessel through the slots in the cover and detachably engaging said keepers.

2. A cooking utensil comprising an outer vessel, a perforated inner vessel removably supported within and closing said outer vessel, keepers upon the inner vessel having entrance slots and locking recesses, a cover for the inner vessel provided with slots at diametrically opposite sides thereof, and a handle comprising a spring bow having its ends extending through said slots into said inner vessel and provided with bent extremities to engage said slots and interlock with said recesses in said keepers.

In testimony whereof I affix my signature in presence of two witnesses.

EDGAR W. KENT.

Witnesses:
DANIEL T. CROSS,
FRED L. RICE.